United States Patent
Kennedy, Jr.

(10) Patent No.: US 6,952,158 B2
(45) Date of Patent: Oct. 4, 2005

(54) PSEUDOLITE POSITIONING SYSTEM AND METHOD

(76) Inventor: Joseph P. Kennedy, Jr., 11127 Elmview Pl., Great Falls, VA (US) 22066

( * ) Notice: Subject to any disclaimer, the term of this patent is extended or adjusted under 35 U.S.C. 154(b) by 408 days.

(21) Appl. No.: 10/004,449

(22) Filed: Dec. 6, 2001

(65) Prior Publication Data
US 2002/0094821 A1 Jul. 18, 2002

Related U.S. Application Data
(60) Provisional application No. 60/254,134, filed on Dec. 11, 2000.

(51) Int. Cl.$^7$ .............................................. G08B 25/00
(52) U.S. Cl. ............. 340/286.14; 340/988; 340/825.69; 340/825.72; 455/456.1; 455/457
(58) Field of Search ........................... 340/988, 825.69, 340/825.72, 286.14; 455/521, 456.1, 457, 456

(56) References Cited

U.S. PATENT DOCUMENTS

| | | | |
|---|---|---|---|
| 4,728,959 A | 3/1988 | Maloney et al. | |
| 4,845,504 A | 7/1989 | Roberts et al. | |
| 4,891,650 A | 1/1990 | Sheffer | |
| 5,056,106 A | 10/1991 | Wang et al. | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |
| 5,404,376 A | 4/1995 | Dent | |
| 5,506,864 A | 4/1996 | Schilling | |
| 5,508,708 A | 4/1996 | Ghosh et al. | |
| 5,512,908 A | 4/1996 | Herrick | |
| 5,515,419 A | 5/1996 | Sheffer | |
| 5,519,760 A | 5/1996 | Borkowski et al. | |
| 5,592,180 A | 1/1997 | Yokev et al. | |
| 5,614,914 A * | 3/1997 | Bolgiano et al. | ........... 342/364 |
| 5,675,344 A | 10/1997 | Tong et al. | |
| 5,736,964 A | 4/1998 | Ghosh et al. | |
| 5,815,538 A | 9/1998 | Grell et al. | |
| 5,900,838 A | 5/1999 | Khan et al. | |
| 5,914,687 A | 6/1999 | Rose | |
| 5,945,948 A | 8/1999 | Buford et al. | |
| 5,959,580 A | 9/1999 | Maloney et al. | |
| 5,970,413 A | 10/1999 | Gilhousen | |
| 6,047,192 A | 4/2000 | Maloney et al. | |
| 6,097,336 A | 8/2000 | Stilp | |
| 6,108,555 A | 8/2000 | Maloney et al. | |
| 6,119,013 A | 9/2000 | Maloney et al. | |
| 6,127,975 A | 10/2000 | Maloney | |
| 6,184,829 B1 | 2/2001 | Stilp | |
| 6,246,884 B1 * | 6/2001 | Karmi et al. | ................ 455/521 |
| 6,281,834 B1 | 8/2001 | Stilp | |
| 6,288,675 B1 | 9/2001 | Maloney | |
| 6,288,676 B1 | 9/2001 | Maloney | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,366,241 B2 | 4/2002 | Pack et al. | |
| 6,400,320 B1 | 6/2002 | Stilp et al. | |
| 6,463,290 B1 | 10/2002 | Stilp et al. | |
| 6,522,890 B2 * | 2/2003 | Drane et al. | ............. 455/456.5 |
| 6,646,604 B2 | 11/2003 | Anderson | |

* cited by examiner

Primary Examiner—Julie Bichngoc Lieu
(74) Attorney, Agent, or Firm—Duane Morris LLP

(57) ABSTRACT

A system and method for determining the geolocation of autonomous mobile appliances using timing measurements from reference signals to determine position. The system and method allows the use of reference signals from disparate communication and navigation networks of which the mobile appliance may or may not be a network member. The system and method also maintains and dynamically updates its database of the location of reference signal transmitters and the reference signals emitted by the reference signal transmitters upon the detection of new reference signals or when the geolocation solution of a mobile appliance is over-determined.

35 Claims, 6 Drawing Sheets

PSEUDOLITE POSITIONING SYSTEM AND METHOD

This application claims the priority of co-pending and commonly-assigned U.S. Provisional Patent Application Ser. No. 60/254,134 entitled "Pseudolite Positioning System and Method" filed Dec. 11, 2000.

BACKGROUND OF THE INVENTION

The present invention relates to a system and method for geolocating a mobile wireless appliance. More particularly, the present invention relates to a system for determining the geographic location of mobile appliances using signals emitted from disparate navigation and/or communications systems.

A geolocation positioning method for determining the geolocation of a mobile appliance capable of receiving reference signals from a plurality of transmitters in disparate communication systems is disclosed. In one embodiment, the method comprises the steps of receiving radio frequency signals at the mobile appliance, identifying reference signals in the received radio frequency signals, determining a time difference of arrival between each pair of identified reference signals, determining a geographic area in which the mobile appliance is located based on the identity of the identified reference signals, and determining a geolocation of the mobile appliance based on the determined time differences of arrival of the identified reference signals by conventional TDOA methods.

One type of prior art geolocation system measures a signal that is emitted by a mobile radio and is received at multiple base stations which are in the same communication network as the mobile radio. The multiple base stations are in separate geographic locations. Each base station conducts time difference of arrival ("TDOA") measurements of the received signal and the TDOA measurements are used to determine the location the mobile radio using conventional positioning algorithms. A global positioning system (GPS) is typically used to provide a common time reference among the base stations and the mobile radio.

One important attribute of these prior art geolocation systems is that the mobile radio and each of the multiple base stations must all be part of the same communication network so that synchronization can be maintained between the mobile radio and the base stations. Another attribute is that a reverse communication channel must be established between the mobile radio and at least one of the base stations in order for the base stations to make accurate TDOA measurements. Additionally, prior art systems are limited to geolocating a mobile radio only from those base stations in existence at the time the geolocation system is launched. Prior art systems do not have the capability to automatically update, refine, and expand their database of base station locations during a geolocating event.

Attempts have been made to design a mobile radio capable of making TDOA measurements locally at the mobile radio. A system of this design requires that the mobile appliance be capable of receiving GPS signals or timing signals from another time-standard system. However, receiving GPS signals or other time-standard signals at the mobile radio presents special problems. For example, in order for GPS to be effective, the mobile radio must have a clear line of sight to a GPS satellite. This requirement makes the system ineffective in certain areas where direct line of sight is not possible, such as urban environments, wooded and/or mountainous areas, underneath bridges, in tunnels, etc. The slant angles between the GPS satellites and the mobile radio can cause errors due to multipath effects, as well as distortion due to interference from the ionosphere. Additionally, because GPS operates in a different band than the mobile radio, a separate GPS antenna is required in order to receive the GPS signals. The addition of a second antenna makes the mobile radio bulky and cumbersome to carry and use.

For other time-standard signals, the communication network must be modified so as to send the time-standard signals to the mobile appliance. Such a modification to the communication network may be prohibitively expensive and therefore impractical.

Another type of prior art geolocation system measures the direction from which a mobile radio signal is received. A mobile radio transmits a signal which is received by multiple base stations in separate geographic locations. Each base station has an antenna array which measures the radio wave phase difference at different antenna elements in the array. An angle of arrival of the mobile radio's signal is calculated and a line of bearing to the mobile radio is determined. The intersection of the lines of bearing from the multiple base stations determine the geolocation of the mobile radio.

Geolocation systems that measure the angle of arrival are susceptible to error due to multipath signals arriving at the antenna arrays from different directions. Additionally, the base stations require an antenna array, rather than a single antenna, in order to determine the angle of arrival of the mobile radio's signal. The need for the addition of an antenna array at the base stations presents a significant cost issue.

Yet another type of prior art geolocation system uses a time ranging technique which measures the time required for a signal which is emitted from a base station to be received by the mobile radio. The time required for the mobile radio to receive a base station's signal defines a circular locus of location points around the base station. The intersection of the circular locus of location points from multiple base stations determines the geolocation of the mobile radio.

The time ranging technique requires that the mobile radio and each of the multiple base stations must all be part of the same communication network so that synchronization can be maintained between the mobile radio and the base stations. If the mobile radio entity calculating location does not know exactly when the base station emitted the ranging signal, the locus of location points around the base station cannot be determined. Additionally, a reverse communication channel must be established between at least one of the base stations and the mobile radio, in order to determine the intersection of the circular locus of location points from the multiple base stations.

Thus, there is a need for a geolocation system in which the geolocation of mobile appliances can be determined without requiring the mobile appliance to be in communication with multiple base stations in the same communication network as the mobile appliance. There is also a need for a compact mobile appliance which does not need to be synchronized with a particular communication network in order for the mobile appliance to be geolocated. Additionally, the measurement of timing signals at the mobile appliance without the need to receive input from any fixed network is desirable.

These and other needs are satisfied by the geolocation positioning system and method of the present invention which is configured to determine the geolocation of a mobile appliance capable of receiving reference signals from a plurality of reference signal transmitters in disparate navigation or communication systems. Under one embodiment of the present invention, the reference signal transmitters need not be synchronized with the mobile appliance in order to geolocate the mobile appliance. Furthermore, the mobile appliance receives reference signals and makes timing measurements without assistance from any fixed network; no forward link data needs to be sent to the mobile appliance from a fixed network.

The mobile appliance can be any one or more of the following: laptop computer, mobile telephone, mobile radio, walkie-talkie, personal digital assistance, pager, personal tracking device, vehicle, automotive anti-theft device, telemetry device, fleet tracking device, anti-location fraud device, or any other similar device or system for which the geolocation of the device or system is desired.

The reference signals can be, for example, one or more of the following: J-STD 008/IS-95 pilot signals, mobile telephone timing signals, wireless communications network timing signals including 3G air interface networks, GPS differential correction timing signals, or GPS/GNSS augmentation signals. It is to be understood that the invention is not limited to only those systems that use the above-mentioned signals, rather the invention can be used with any reference signal that is linked to a time standard and used by a communication and/or navigation system typically to synchronize various base stations, emitters, mobile appliances, users of the system, etc. It is to be appreciated that other signals that are inherent in a communications system may also be used as a reference signal by the present inventive system and method. As used herein, reference signals, timing signals, pilot signals, and psuedolites all relate to one or more of the above-mentioned signals.

The benefits of using the present inventive system and method are many and varied, such as locating a mobile appliance for safety reasons, to effect a rescue, for vehicle or personal tracking, for location specific billing, and other like functions that would be apparent to those of skill in the art.

Accordingly, it is an object of the present invention to provide a novel system and method of geolocating a mobile appliance from a plurality of reference signal sources in disparate navigation and/or communication systems.

It is another object of the present invention to provide a novel system and method of geolocating a mobile appliance from a plurality of reference signal sources in the same communication system.

It is yet another object of the present invention to provide a novel system and method for geolocating a mobile appliance from the differences in the times of arrival of reference signals received by the mobile appliance without the need to receive synchronization signals from the fixed network.

It is still another object of the present invention to provide a novel system and method of geolocating a mobile appliance from a plurality of reference signal sources wherein the mobile appliance is not synchronized with any of the plurality of reference signal sources.

It is a further object of the present invention to provide a novel system and method of updating a database of geolocation information for a plurality of reference signal sources and automatically updating the geolocation information in the database with data obtained from geolocation events.

It is yet a further object of the present invention to provide a novel system and method of adding the geolocation information and the reference signal code phases and frequencies for a new reference signal source to the database of reference signal sources and automatically updating the geolocation information in the database with data obtained from geolocation events.

It is still a further object of the present invention to provide a novel system and method for geolocating a mobile appliance for safety reasons, to effect a rescue, for vehicle or personal tracking, or for location specific billing.

It is still a further object of the present invention to provide a novel system and method for geolocating a mobile appliance by a two step process.

It is still a further object of the present invention to provide a novel system and method for geolocating a mobile appliance by transmitting signals from the mobile appliance to a fixed network where the signals transmitted are representative of the difference in the time of arrival at the mobile applicant of the signals from the reference signal sources in disparate communication systems.

It is still a further object of the present invention to provide a novel system and method for geolocating a mobile appliance which includes a geolocation station that is entirely passive.

It is still a further object of the present invention to provide a novel system and method for geolocating a mobile appliance which includes a geolocation station that is not in communication with the reference signal sources.

It is still a further object of the present invention to provide a novel system and method for geolocating a mobile appliance which includes a geolocation station that does not transmit a signal to the mobile appliance.

It is still a further object of the present invention to provide a novel system and method for geolocating a mobile appliance where the mobile appliance stores the received reference signals in a buffer before conducting signal detection and measurement.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
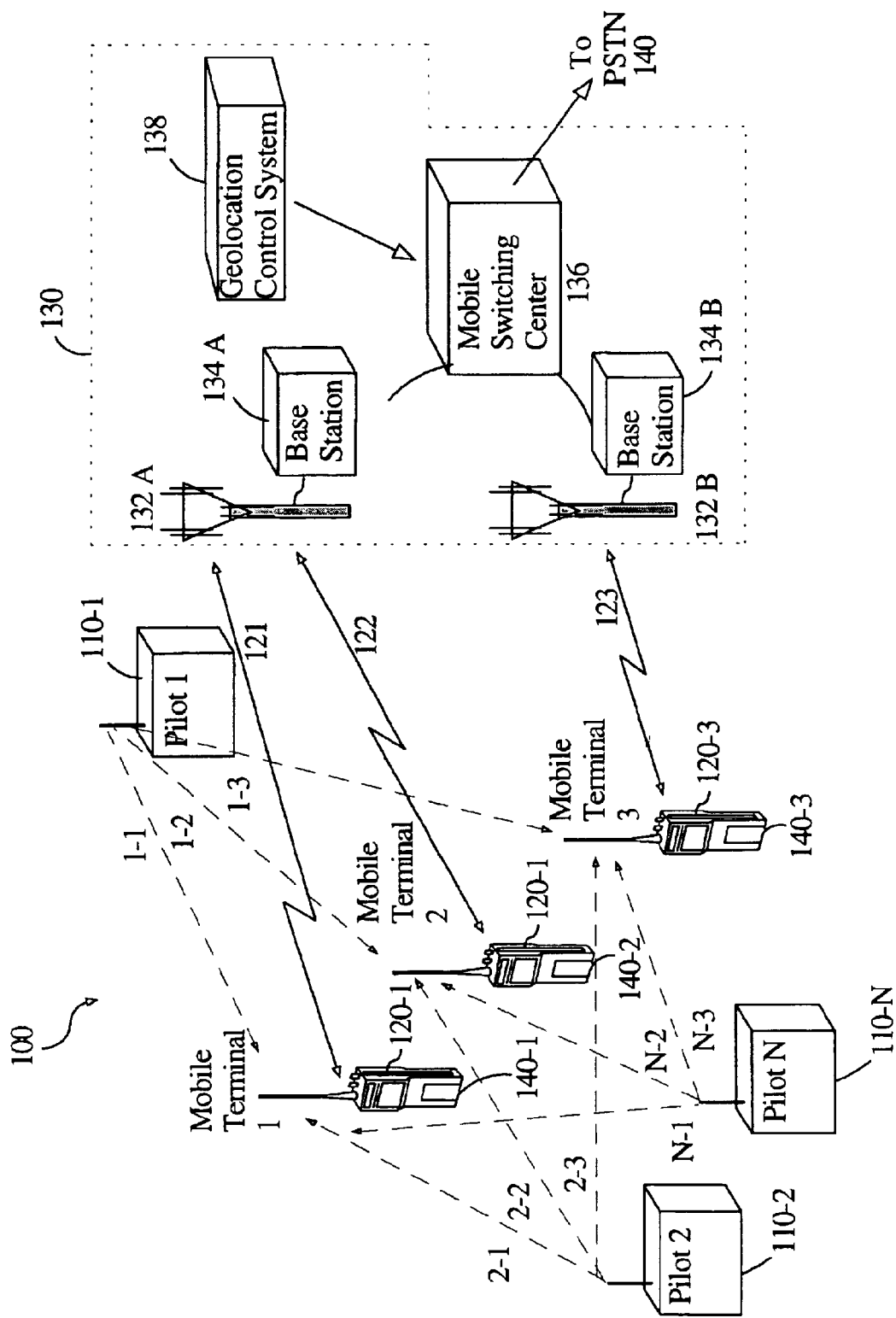
FIG. 1 is a notional schematic diagram of a geolocation system showing plural stations from different networks each emitting a pilot signal receivable by mobile appliances.

As mentioned above, the present inventive system and method is capable of geolocating a mobile appliance from reference signals received at the mobile appliance from plural reference signal transmitters which may be in disparate navigation and/or communication networks and therefore are not synchronized with each other. Furthermore, the mobile appliance need not be synchronized with any of the reference signal transmitters nor does a forward data link (i.e., from the reference signal transmitters to the mobile appliance) need to be established. It should be understood that the reference signal transmitters may all be members of a particular navigation and/or communication system or some may be members of different navigation and/or communication systems. Additionally, the mobile appliance may be part of a navigation and/or communication system of which one or more of the reference signal transmitters is also a member and therefore the mobile appliance may be synchronized with one or more of the reference signal transmitters.

One embodiment of the geolocation system comprises a reference signal scanner ("RSS") and a geolocation control system ("GCS"). The RSS is typically located in the mobile appliance and is capable of receiving radio frequency signals, detecting and identifying reference signals in the received radio frequency signals, and determining the time difference of arrival between pairs of reference signals received by the mobile appliance. The mobile appliance may transmit some or all of the time difference of arrival information to a fixed network to which the GCS is in communication or directly to the GCS itself. The GCS may be operatively connected to a fixed network to which the mobile appliance communicates. The GCS may be located, for example, at one of the reference signal transmitters, at any remote site or central location, or even with the mobile appliance. The GCS receives the time difference of arrival measurements from the mobile appliance and calculates the geolocation of the mobile appliance using a two step procedure. First, the GCS determines a gross location based on the reference signals received by the receiver in the mobile appliance. Second, the GCS determines the geolocation of the mobile appliance by conventional time difference of arrival ("TDOA") means. The determination of the geolocation of a mobile appliance is known as a "geolocation event".

As indicated above, the mobile appliance may comprise a reference signal scanner capable of receiving radio frequency signals and scanning the received radio frequency signals for reference signal code phases and frequencies. The RSS comprises a converter for converting the received radio frequency signals into digital information, a memory buffer for storing the digital information, and scanning means for scanning the digital information stored in the memory buffer to detect and measure the amplitude and phase of reference signal codes as well as the time interval between the reception of any two received reference signals.

The GCS may comprise a coarse location means and a TDOA means. The coarse location means determines the geographic area in which the mobile appliance is located based on the identity of reference signals received by the mobile appliance. In one embodiment of the invention, the GCS further includes a database of known reference signal transmitters including the code phase of the reference signal and the geophysical coordinates of the reference signal transmitter. The GCS receives from the mobile appliance the number of reference signals received by the mobile appliance and the time differences between the reference signals and compares that information with the information in the database to determine the coarse location of the mobile appliance, i.e., the general geographic area where it is possible to receive the pattern of reference signal time differences received by the mobile appliance.

Once the general geographic area of the mobile appliance has been determined, the GCS determines which reference signal transmitters transmitted the reference signals received by the mobile appliance and the TDOA means uses the time differences between the reference signals received by the mobile appliance to determine the exact position of the mobile appliance by applying conventional TDOA techniques.

The geolocation system can also include a transmitter in the mobile radio capable of transmitting the identity and determined time difference of arrival for each identified pilot signal to a control system. The transmitter transmits the reference signal identity and determined time difference of arrival to the control system in compact differential timing format.

In one embodiment, the geolocation system comprises a database of known reference signal transmitters which may include the code phases and frequencies of the reference signals emitted by one or more of the transmitters and may also include the geophysical coordinates of one or more transmitter. The information in this database for one or more transmitters may be updated from time to time based on, for instance, the historical results of geolocation events where such events included information from such transmitter.

It will be appreciated that, according to the present invention, it is not necessary to download the sequences of the received reference signals or to have any knowledge at the mobile appliance as to the location of the reference signal transmitters or the time when the reference signals were transmitted from the reference signal transmitters. It will also be appreciated that the signal detection and measurement at the mobile appliance is accomplished without a forward link message from a fixed network for timing reference, queuing, and/or synchronization. It will be further appreciated that the mobile appliance only transmits differences in time of arrival of the reference signals received by the mobile appliance to the fixed network.

The geolocation positioning method can further comprise transmitting the identity and determined time difference of arrival for each identified reference signal to a geolocation control system.

In one embodiment, the step of identifying reference signals includes identifying code phases and frequencies for each identified reference signal. The step of identifying includes converting the received radio frequency signals into digital information, storing the digital information into a memory buffer, and scanning the digital information stored in the memory buffer to identify the reference signals. The step of determining a geographic area comprises comparing the identity of the identified reference signals to a database of known reference signal transmitters and their geophysical coordinates. The method also can comprise determining whether the identified reference signals are cataloged in the database and adding reference signal transmitter information to the database, such as code phases and frequencies and geophysical coordinates, if the identified reference signals are not cataloged.

Embodiments of the invention will now be described as referenced to the several drawings. With attention directed to FIG. 1, one embodiment of the inventive geolocation system 100 is schematically depicted. The mobile reference transmitters 110-1, 110-2, and 110-N are shown each transmitting a unique reference signal capable of being received by mobile appliances 120-1, 120-2, and 120-3. The reference signals are depicted as dashed lines and are numbered according to the transmitter and receiver shown at each end of the signal as depicted in FIG. 1. Therefore, reference signal transmitter 110-1 is transmitting a reference signal unique to reference signal transmitter 110-1 and is shown as reference signals 1-1, 1-2, and 1-3 received by mobile appliances 120-1, 120-2, and 120-3, respectively. It shall be understood that the reference signals 1-1, 1-2, and 1-3 are the same reference signal. Likewise, reference signal transmitter 110-2 is depicted as transmitting reference signals 2-1, 2-2, and 2-3, all of which are the same reference signal and unique to reference signal transmitter 110-2. Reference signal transmitter 110-N is depicted as transmitting reference signals N-1, N-2, and N-3, all of which are the same reference signal and unique to reference signal transmitter 110-N.

Each of the mobile appliances is shown in communication with the communication system 130. The mobile appliances 120-1 and 120-2 are shown communicating with the communication system 130 through antenna 132A via signals 121 and 122, respectively. The mobile appliance is shown in communication with the communication system 130 through antenna 132B via signal 123. The communication system 130 includes the antennas 132A and 132B, each connected with the base station 134A and 134B, respectively. The base stations are connected with the mobile switching center 136 which may be connected to the public switched telephone network ("PSTN") 140.

According to the present invention, each of the mobile appliances 120-1, 120-2, and 120-3 includes a Reference Signal Scanner ("RSS") 140-1, 140-2, and 140-3, respectively. Each RSS is capable of receiving radio frequency ("RF") signals, identifying reference signals in the received RF signals, and determining the time difference of arrival between any pair of reference signals received. The operation of the RSS will be described in more detail below.

Also according to the present invention, the mobile switching center 136 includes a Geolocation Control System ("GCS") 138 which receives the time difference of arrival data from the RSS and determines the location of the mobile appliance associated with the RSS which transmitted the time difference of arrival data. The operation of the GCS will be described in more detail below.

Although three mobile appliances are shown in FIG. 1 it is to be understood that the present invention is not limited to any particular number of mobile appliances. The following discussion will be directed towards one of the mobile appliances. Those of skill in the art will understand that the following discussion applies to any mobile appliances configured to operate in accordance with the present invention.

While three reference signal transmitters are depicted in FIG. 1, and at least three reference signal transmitters are desirable for geolocating a mobile appliance, the present invention is operative with any number of reference signal transmitters. Furthermore, when more reference signals are detected by the RSS than are required for geolocating the mobile appliance (i.e., an overdetermined solution condition) the inventive system can update the database of geolocation coordinates of the reference signal transmitters and/or add the geolocation coordinates of a reference signal transmitter that was not previously recognized. These functions of the inventive system and method will be further described below.

FIG. 1 depicts the mobile appliances in communication with the communication system 130 and the reference signal transmitters 110-1, 110-2, and 110-N as not being members of the communication system 130. Therefore, the mobile appliances in FIG. 1 would not be synchronized to any of the reference signal transmitters. As one of skill in the art would recognize, and as mentioned above, the inventive system and method would still be operative if one or more of the reference signal transmitters were part of, and therefore synchronized with, the communication system 130.

As used herein, the term "mobile appliance" includes, but is not limited to, a mobile phone, tracking device, locating device, or any other wireless device that is in two-way communication with at least one base station. Examples of mobile unites are mobile phones, vehicle location devices, fleet vehicle tracking devices, personal medical emergency transmitters, and other like device.

Figure 2:
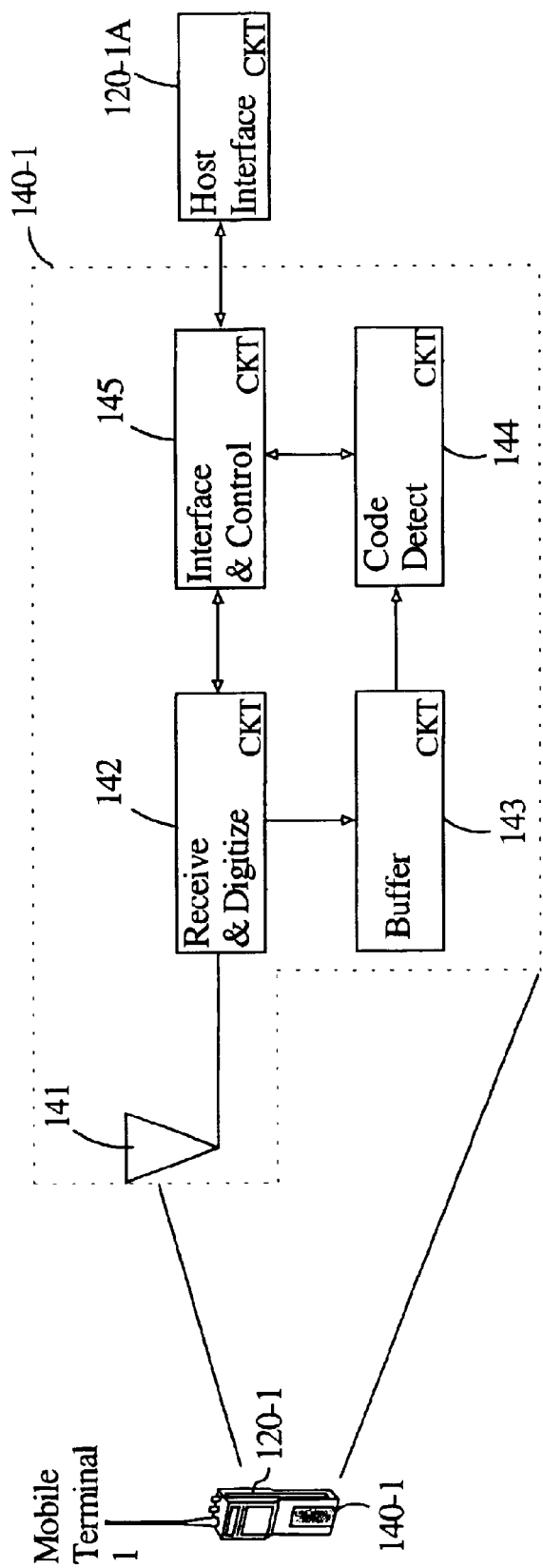
FIG. 2 is a functional block diagram of a Reference Signal Scanner which receives and processes reference signals at a mobile appliance according to the invention.

With reference now to FIG. 2, where like numbers refer to like components with FIG. 1, the operation of the RSS will be described. FIG. 2 depicts the mobile appliance 120-1 and the associated RSS 140-1. The RSS 104-1 includes the antenna 141, the receiver and digitizer circuit 142, the buffer circuit 143, the code detect circuit 144, and the interface and control circuit 145 which interfaces with the host interface circuit 120-1A of the mobile appliance 120-1. In operation, the receiver and digitizer circuit 142 tunes to frequency bands of known reference signals and receives, via the antenna 141, the RF signals in the frequency band. The receiver and digitizer circuit 142 digitizes a predetermined portion of the received RF signals and sends the digitized version of the signal to the buffer circuit 143 for maintaining the digitized signal in memory. The code detect circuit 144 searches the signals in the buffer circuit 143 in code phase and frequency to detect and measure the amplitude and phase of reference signals stored in the buffer circuit. Typical reference signals from different base stations in a code division multiple access ("CDMA") communication system (IS-95) are transmitted at a same frequency but are offset in phase with sixty-four possible different phase offsets referred to herein as "code phases", although it is to be understood that the term "code phase" as used herein is not limited to IS-95 reference signals. Likewise, the invention is not limited to IS-95 reference signals, rather the invention can be used with any reference signal from any known communication/navigation system that transmits reference signals.

Figure 3:
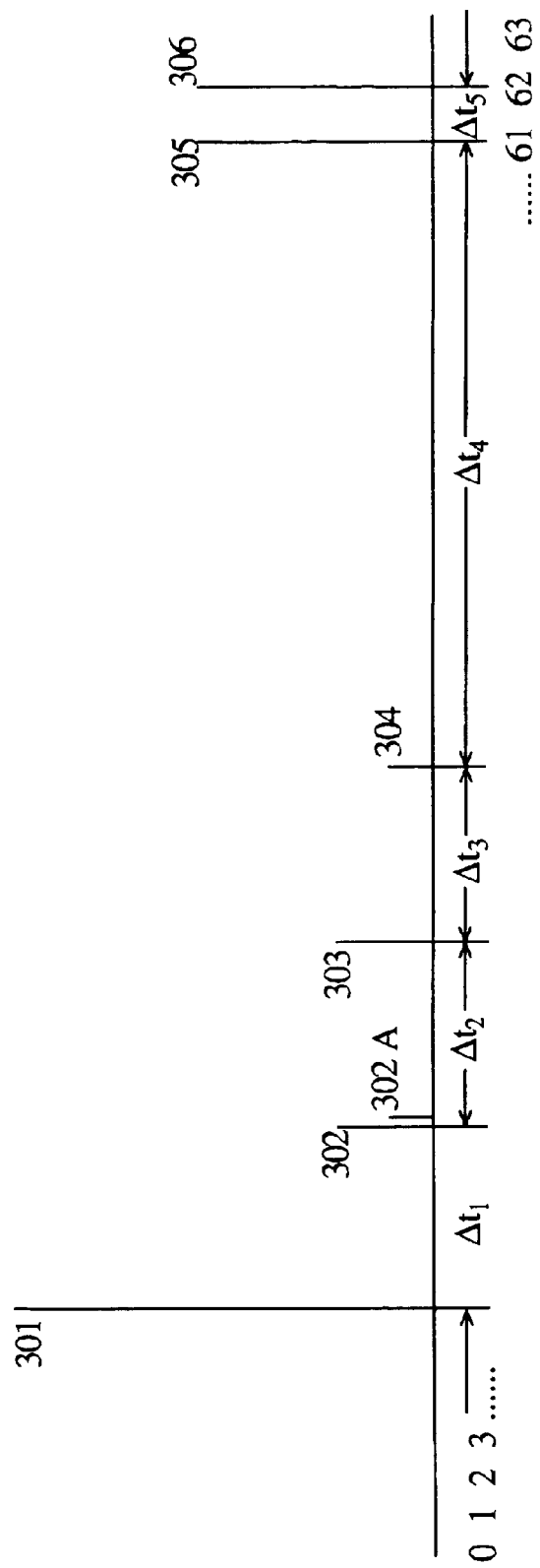
FIG. 3 is a graph depicting an exemplary set of reference signals received at a Reference Signal Scanner at a mobile appliance.

FIG. 3 shows a typical pattern of reference signals which might result from the code detection process described above in the RSS. The horizontal axis of the graph is an arbitrary value indicating the sixty-four possible code phases for an IS-95 reference signal at a particular frequency. The vertical axis is a measure of the amplitude of the received reference signal. The assignment of a received reference signal to a particular location on the graph is arbitrary since the RSS has no way of identifying a received reference signal with a particular code phase. According to the invention, it is unnecessary that the RSS know the exact code phase for the received reference signals. Rather, only the time difference between received reference signals. It is this feature which allows the mobile appliance to be geolocated using reference signals from disparate communication/navigation systems for which the mobile appliance need not be synchronized.

For example, with continuing reference to FIG. 3 and additional reference to FIG. 2, reference signals 301 through 306 have been detected by the code detect circuit 144 of the RSS 140-1 of the mobile appliance 120-1 the geolocation of which is to be determined. For this example, the reference signals 301 through 306 have the relative offset in code phase shown in FIG. 3. It should be appreciated that the present invention is capable of operating with any combination of received reference signals and is not limited to the set of received reference signals depicted in FIG. 3. It should be noted that the detected reference signal 302A is likely a multipath component of the reference signal 302 and therefore the reference signal 302A would be ignored by the RSS. The code detect circuit 144 measures the time difference between the relative offsets in code phase of adjacent received reference signals, shown as $\Delta t_1$ through $\Delta t_5$ on FIG. 3 as well as the amplitude of the received reference signals. The time differences $\Delta t_1$ through $\Delta t_5$ and the amplitude of the received reference signals, referred to herein as locating information, are transmitted from the mobile appliance 120-1 to the GCS 138, either directly or via the communication system 130. The locating information may either be transmitted by the mobile appliance's transmitter via the interface and control circuit 145 or the time difference may be transmitted by a RSS transmitter (not shown) via the interface and control circuit 145. The particular transmitter used to transmit the locating information from the mobile appliance to the GCS is not material to the invention.

Figure 4:
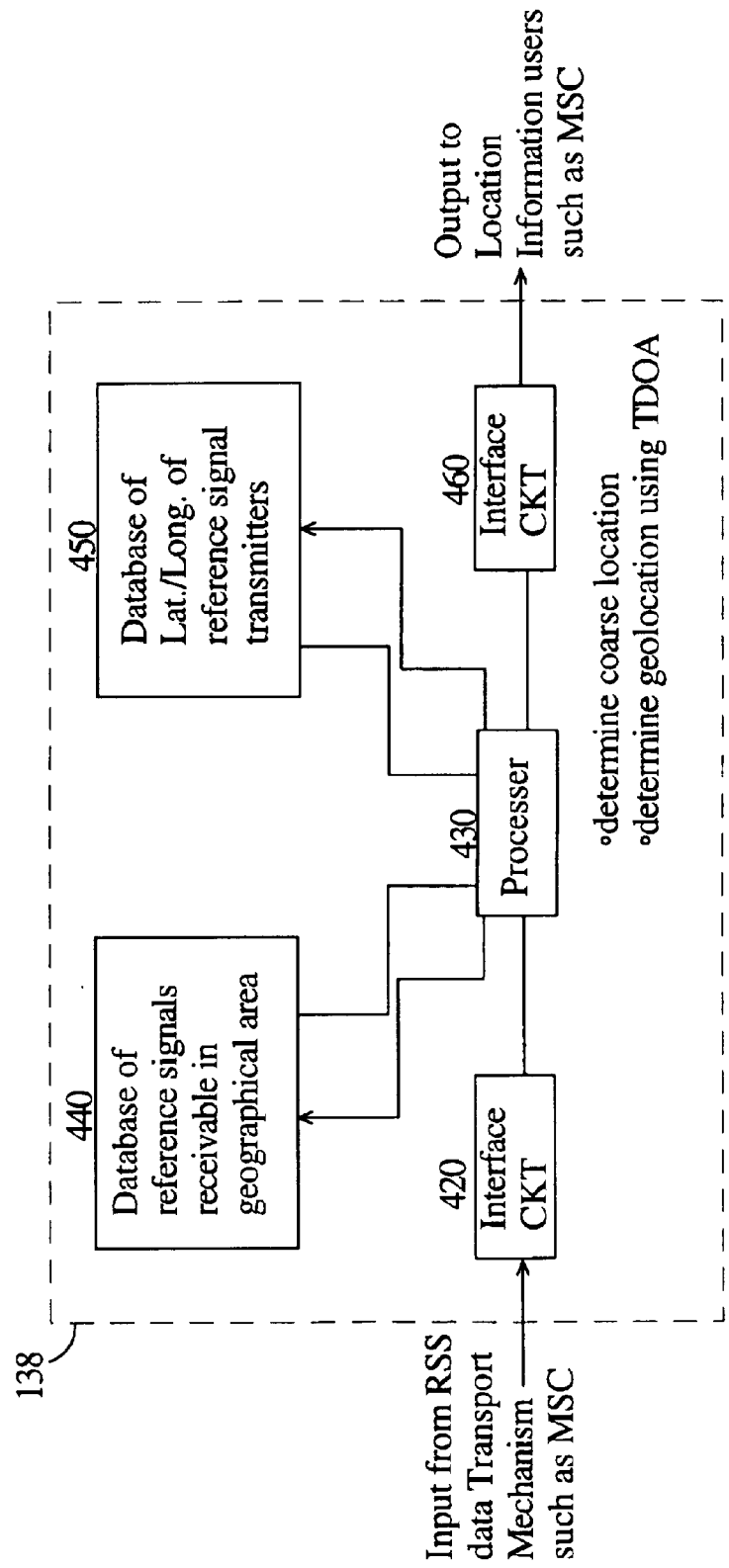
FIG. 4 is a functional block diagram of a Geolocation Control System which receives Reference Signal Scanner data transmitted from a mobile appliance and determines the geolocation of the mobile appliance.

With reference now to FIG. 4, a Geolocation Control System 138 is depicted. The GCS 138 includes and interface circuit 420, a processor 430, a first data base 440, a second database 450, and an interface circuit 460. The first database 440 comprises a list of known reference signals, including the RF frequency and phase and amplitude information of the reference signals, that can be received in each of a predetermined number of subareas within the operating area of the geolocation control system 138. The information in the first database is gathered prior to a geolocating event and is typically gathered by prior surveys of each of the subareas as is known in the art. The second database 450 comprises a list of the reference signal transmitters, including the latitude and longitude of the reference signal transmitters, emitting the known reference signals. It is to be understood that the first and second databases may be combined into a signal database.

Continuing with the example above, the mobile appliance 120-1 transmits the locating information to an antenna 132A which receives the locating information and sends the locating information via the base station 134A to the mobile switching center 136. The mobile switching center sends the locating information to the interface circuit 420. It should be appreciated that the input to the interface circuit 420 ultimately comes from the RSS on a mobile appliance being geolocated and may be routed through any data transport mechanism such as the MSC. It should be understood that the locating information may be sent directly from the mobile appliance to be geolocated to the GCS 138. The interface circuit 420 sends the locating information to the processor 430. The processor compares the locating information with the reference signal information in the first database 440 in order to first determine the subarea in which the mobile appliance to be geolocated is located. The comparison may include comparing the time difference information from the mobile appliance with the stored code phase information in the first database, as well as comparing the time difference/amplitude information pairs for the reference signals from the mobile appliance with the stored code phase/amplitude for the reference signal information in the first database. Matching the measured time difference/amplitude information pairs from the mobile appliance with the stored code phase/amplitude information pairs from the first database translates the relative time difference information received from the mobile appliance into actual code phase information to thereby yield the actual reference signals received by the mobile appliance. After the subarea is determined in which the mobile appliance is located, and the actual reference signals received are identified, the processor retrieves from the second database 450 the latitude and longitude of the reference signal transmitters that emitted the reference signals received by the mobile appliance.

The processor 430 now has the following information: (a) the location of the reference signal transmitters which emitted the reference signals received by the mobile appliance, and (b) the relative times of arrival of the reference signals at the mobile appliance. Using standard TDOA techniques known in the art, a geolocation of the mobile appliance is determined.

The processor 430 sends the geolocation information to the interface circuit 460, which sends the geolocation information to the mobile switching center 136. It should be appreciated that the interface circuit 460 may output the geolocation information to any location information user, such as the MSC. From the mobile switching center, the geolocation information can be sent to any number of destinations known in the art that would use the geolocation information for display in any number of known ways in any number of known systems.

In a situation where more reference signals are received at the mobile appliance than are needed to geolocate the mobile appliance, i.e., an overdetermined solution, the information received by the mobile appliance may be used by the processor to refine the latitude and longitude information for the reference signal transmitters whose reference signals were received by the mobile appliance in the overdetermined solution situation. Additionally, if one or more reference signal is received by the mobile appliance that was not previously in the first data base 440, i.e., a new reference signal, an overdetermined solution condition allows the opportunity to add the new reference signal to the first data base and for the latitude and longitude of the reference signal transmitter that emitted the new reference signal to be determined by standard TDOA methods and added to the second database 450.

Figure 5A:
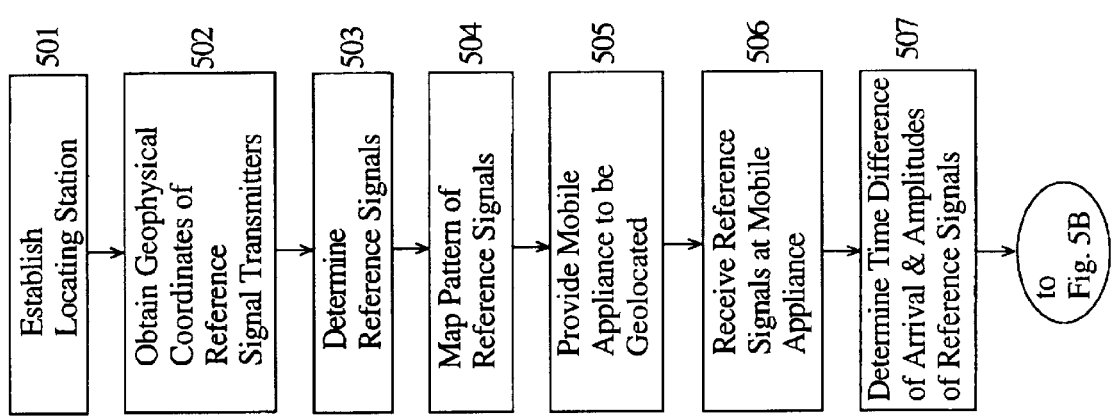
FIGS. 5A and 5B depict a flow chart of the high-level procedure used to geolocate a mobile appliance according to one embodiment of the present invention.
Figure 5B:
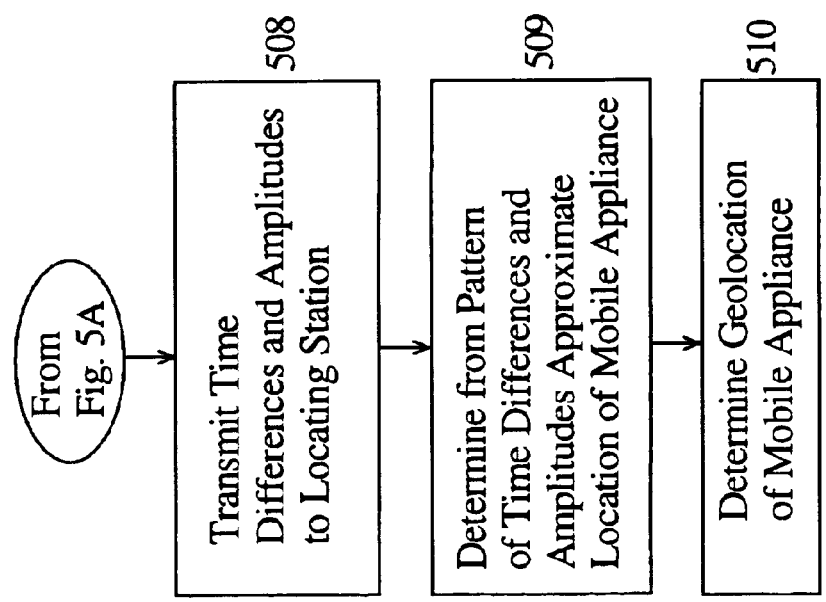

FIGS. 5A and 5B depict a flow chart showing the high-level steps used to geolocate a mobile appliance according to one embodiment of the present invention. Step 501 is establishing a locating station in a service area for geolocating the mobile appliance. In step 502, the geophysical coordinates of the reference signal transmitters in the service area are obtained and entered into a database, such as the database 440 in FIG. 4. In step 503 the reference signals that can be received are determined by methods known in the art, such as performing a survey of the service area and determining which reference signals, in both code phase and amplitude, can be detected in particular subareas of the service area. Step 504 entails mapping the patterns of reference signals available in the subareas and entering that data into a database, such as the database 450 of FIG. 4. In step 505, a mobile appliance to be geolocated is provided in the service area and in step 506, the mobile appliance receives reference signals. In step 507, the mobile appliance determines the time difference of arrival between adjacent reference signals, as described above and shown in FIG. 3, as well as the amplitude of the reference signals. In step 508, the mobile appliance then transmits the time differences and the amplitudes to the locating station, such as the GCS 138 in FIG. 1. In step 509, the locating station determines a coarse location for the mobile appliance, as described above, by matching the code phase/amplitude pairs received from the mobile appliance with the code phase/amplitude pairs in the database 440. In step 510, the locating station determines the geolocation of the mobile appliance by standard TDOA means known in the art, as described above.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of geolocating a mobile appliance from a plurality of reference signal sources in disparate communication systems comprising the steps of:
   (a) establishing a locating station in a service area;
   (b) establishing the geophysical coordinates of the plurality of reference signal sources in the service area of the locating station irrespective of the communication system in which the reference signal sources are operative;
   (c) determining the reference signals emitted by each of the plurality of reference signal sources;
   (d) mapping the pattern of said reference signals and time differences between said reference signals emitted from the reference signal sources in the service area;
   (e) providing a mobile appliance the location of which is to be determined;
   (f) receiving at the mobile appliance energy from at least two of the plurality of disparate reference signal sources;
   (g) determining at the mobile appliance reference signals from the received energy;
   (h) determining at the mobile appliance the time difference of arrival between each pair of reference signals received from the plurality of disparate reference signal sources;
   (i) transmitting the determined time differences to the locating station;
   (j) receiving at the locating station the time differences transmitted by the mobile appliance;
   (k) determining at the locating station the pattern of received reference signals from the received time differences;
   (l) determining at the locating station an approximation of the location of the mobile appliance from a comparison of the determined pattern of received reference signals and the mapped pattern of reference signals to thereby determine the identity of the reference signal sources whose reference signals were received by the mobile appliance; and
   (m) geolocating at the locating station the mobile appliance from the time differences received from the mobile appliance by TDOA techniques from the identified reference signal sources.

2. The geolocation method of claim 1 including the further steps of:
   (a)(i) providing means of communication between the locating station and the public switched telephone network;
   (a)(ii) providing a geolocation office connected to the public switched telephone network for gathering geolocation information; and
   (m)(i) transmitting the geolocation information of the mobile appliance to the geolocation office over the public switched telephone network.

3. The geolocation method of claim 2 wherein the step of providing means of communication between the locating station and the public switched telephone network is independent of the disparate communication systems in which the plurality of reference signal sources are operating.

4. The geolocation method of claim 1 including the further steps of:
   (a)(i) providing means of communication between the locating stations and a computer network;
   (a)(ii) providing a network node connected to the computer network for gathering geolocation information; and
   (m)(i) transmitting the geolocation information of the mobile appliance to the network node over the computer network.

5. The geolocation method of claim 4 wherein the step of providing means of communication between the locating station and the computer network is independent of the disparate communication systems in which the plurality of reference signal sources are operating.

6. The geolocation method of claim 1 including the further steps of:
   (a)(i) providing means of communication between the locating system and a wireless telephone network;
   (a)(ii) providing a geolocation office connected to the wireless telephone network for gathering geolocation information; and
   (m)(i) transmitting the geolocation information of the mobile appliance to the geolocation office over the wireless telephone network.

7. The geolocation method of claim 6 wherein the step of providing means of communication between the locating system and the wireless telephone network is independent of the disparate communication systems in which the plurality of reference signal sources are operating.

8. The geolocation method claim 1 wherein step (g) includes the steps of:
   (g)(i) digitizing the received energy;
   (g)(ii) buffering the digitized energy; and
   (g)(iii) detecting reference signals by a comparison of the digitized energy and the determined reference signals of each of the plurality of reference signal sources.

9. The geolocation method of claim 1 wherein the mobile appliance is not part of any of the disparate communication systems of the plurality of reference signal sources.

10. The geolocation method of claim 1 wherein the mobile appliance is not synchronized with any of the plurality of reference signal sources.

11. The geolocation method of claim 1 including the additional steps of:
   (n) providing a database of attributes of each of said reference signal sources including:
      (i) geophysical coordinates; and
      (ii) historical accuracy of geolocation information derived from geolocating mobile appliances during geolocation events by said TDOA techniques;
   (o) determining the accuracy of geolocation information for at least one of the reference signal sources for which a reference signal was received by the mobile appliance during a geolocation event;
   (p) updating the database with the determined geolocation accuracy information;
   (q) comparing the historical accuracy of the geolocation information for at least one of the reference signal sources with a predetermined accuracy criteria;
   (r) determining for which reference signal sources the geolocation information does not meet the predetermined accuracy criteria;
   (s) recalibrating the geophysical coordinates of the reference signal sources which do not meet the predetermined accuracy criteria, by TDOA techniques from reference signal sources for which the geolocation information meets the predetermined accuracy criteria; and (t) updating the database with the recalibrated geophysical coordinates.

12. The geolocation method of claim 1 wherein the mobile appliance is one of the group of laptop computer, mobile telephone, mobile radio, walkie-talkie, personal digital assistant, pager, personal tracking device, vehicle, automotive anti-theft device, telemetry devices, fleet tracking devices, and anti-location fraud device.

13. The geolocation method of claim 1 wherein the reference signals are one or more of the group of J-STD 008/IS-95 pilot signals, mobile telephone timing signals, wireless communications network timing signals including 3G air interface networks, GPS differential correction timing signals, GPS/GNSS augmentation signals.

14. The geolocation method of claim 1 wherein steps (h) through
   (m) are replaced with the following steps:
   (h') determining at the mobile appliance the time difference of arrival between each pair of reference signals received from the plurality of disparate reference signal sources and the amplitude of the reference signals;
   (i') transmitting information representative of the determined time differences and reference signal amplitudes to the locating station;
   (j') receiving at the locating station said information representative of the time differences and reference signal amplitudes transmitted by the mobile appliance;
   (k') determining at the locating station the pattern of received reference signals from said information representative of the received time differences and reference signal amplitude;
   (l') determining at the locating station an approximation of the location of the mobile appliance from a comparison of the determined pattern of received reference signals and the mapped pattern of reference signals to thereby determine the identity of the reference signal sources whose reference signals were received by the mobile appliance; and
   (m') geolocating at the locating station the mobile appliance from said information representative of time differences and reference signal amplitudes received from the mobile appliance by TDOA techniques from the identified reference signal sources.

15. A method of updating a database of attributes of a plurality of reference signal sources comprising the steps of:
   (a) establishing a database of attributes of a plurality of known reference signal sources including:
      (i) geophysical coordinates;
      (ii) reference signals emitted; and
      (iii) mapped pattern of time differences between reference signals emitted from each of said known reference signal source;
   (b) receiving data representative of the time differences between reference signals received from a plurality of detected reference signal sources where said plurality of detected reference signal sources includes at least one of said known reference signal sources;
   (c) determining if there are more than a predetermined number of received reference signals from said detected reference signal sources;
   (d) determining the existence of new reference signal sources from a comparison of the time differences between said reference signals received from the plurality of detected reference signal sources and said mapped pattern of time differences from the known reference signal sources;
   (e) calculating the geophysical coordinates of the new reference signal sources using TDOA techniques; and
   (f) updating said database with attributes of said new reference signal sources, including:
      (i) geophysical coordinates;
      (ii) reference signals emitted; and
      (iii) mapped pattern of time differences between reference signals emitted from each of said known reference signal source and each new reference signal source.

16. The method of claim 15 wherein steps (a), (b), (d), and (f) are replaced by the following steps:
   (a') establishing a database of attributes of a plurality of known reference signal sources including:
      (i) geophysical coordinates;
      (ii) reference signals emitted; and
      (iii) mapped pattern of time differences between reference signals and reference signal amplitudes for reference signals emitted from each of said known reference signal source;
   (b') receiving data representative of the time differences between reference signals and the reference signal amplitudes received from a plurality of detected reference signal sources where said plurality of detected reference signal sources includes at least one of said known reference signal sources;
   (d') determining the existence of new reference signal sources from a comparison of the time differences between said reference signals and reference signal amplitudes received from the plurality of detected reference signal sources and said mapped pattern of time differences and amplitudes from the known reference signal sources;
   (f') updating said database with attributes of said new reference signal sources, including:
      (i) geophysical coordinates;
      (ii) reference signals emitted; and
      (iii) mapped pattern of time differences between reference signals and reference signal amplitudes for reference signals emitted from each of said known reference signal source and each new reference signal source.

17. A method of locating a mobile appliance from a plurality of reference signal sources in disparate communication systems comprising the steps of:
   (a) mapping the pattern of time differences between pairs of signals from a plurality of reference signal sources receivable in a service area in a communication system;
   (b) transmitting from the mobile appliance to a locating station information representative of the time difference in arrival between pairs of signals from ones of said plurality of reference signal sources;
   (c) determining at the locating station a pattern of received signals from the received time differences; and
   (d) comparing the determined pattern and the mapped pattern of time differences at the locating station to determine the identity of the reference signal sources whose signals were received by the mobile appliance to thereby approximate the geolocation of the mobile appliance.

18. The method of claim 17 including the additional step of:
(e) geolocating at the locating station the mobile appliance by TDOA techniques from the identified reference signal sources.

19. A method of approximating the geolocation of a mobile appliance from a plurality of reference signal sources in disparate communication systems comprising the steps of:
(a) mapping the pattern of amplitudes of signals and time differences between pairs of said signals from a plurality of reference signal sources receivable in a service area in a communication system;
(b) transmitting from the mobile appliance to a locating station information representative of the amplitudes of signals and the time difference in arrival between pairs of said signals from ones of said plurality of reference signal sources;
(c) determining at the locating station a pattern of received signals from the received information representative of said amplitudes and said time differences; and
(d) comparing the determined pattern and the mapped pattern of amplitudes and time differences at the locating station to determine the identity of the reference signal sources whose signals were received by the mobile appliance to thereby approximate the geolocation of the mobile appliance.

20. The method of claim 19 including the additional step of:
(e) geolocating at the locating station the mobile appliance by TDOA techniques from the identified reference signal sources.

21. In a method of geolocating a mobile appliance from a plurality of reference signal sources by TDOA techniques, the improvement of using signals from reference signal sources in disparate communication systems.

22. In a method of geolocating a mobile appliance from a plurality of reference signal sources by TDOA techniques, the improvement of using signals from reference signal sources that are not synchronized with the mobile appliance.

23. In a method of geolocating a mobile appliance from a plurality of reference signal sources by TDOA techniques in which signals are transmitted from the mobile appliance to a locating station, the improvement wherein the signals transmitted to the locating station are representative of the difference in the time of arrival at the mobile appliance of the signals from the reference signal sources.

24. The method of claim 23 wherein the mobile appliance is not synchronized with any of the plurality of reference signal sources.

25. The method of claim 23 wherein the mobile appliance is not synchronized with all of the plurality of reference signal sources.

26. In a method of geolocating a mobile appliance operatively communicating with at least one base station in a first communication system from a plurality of reference signal sources by TDOA techniques in which signals are transmitted from the mobile appliance to a locating station, the improvement wherein the signals transmitted from the mobile to the locating station are representative of the difference in the time of arrival at the mobile appliance of pairs of signals from the reference signal sources transmitted from a second communication system which is disparate from the first communication system.

27. The method of claim 26 wherein the signals transmitted from the mobile appliance to the locating station are also representative of the amplitude of the reference signals at the mobile appliance transmitted from the reference signal sources from the second communication system.

28. A system for geolocating a mobile appliance in a service area from ones of a plurality of reference signal sources in disparate communication systems comprising:
said mobile appliance comprising:
a receiver for receiving energy from ones of the plurality of reference signal sources,
detection means for detecting reference signals from said received energy and calculating the time difference of arrival between pairs of detected reference signals; and
a transmitter for transmitting to a locating station a first signal representative of said time difference of arrival between pairs of detected reference signals;
said locating station comprising:
a receiver for receiving said first signal;
a first database comprising:
geophysical coordinates of each of the plurality of reference signal sources; and
a mapped pattern of time differences between pairs of reference signals emitted from the plurality of reference signal sources;
a first comparison means for comparing the time difference of arrival information in said first signal with the mapped pattern of time differences in the first database; and
TDOA means for geolocating the mobile appliance;
whereby the mobile appliance receives energy from ones of the plurality of reference signal sources, detects reference signals from said received energy, calculates the time difference of arrival between pairs of said reference signals, transmits a first signal representative of the time differences of arrival to the locating station; and
whereby the locating station receives said first signal, compares the received time difference of arrival information in said first signal with the mapped pattern of time differences to thereby determine the approximate location of the mobile appliance, and subsequently geolocates the mobile appliance by TDOA techniques.

29. The geolocation system of claim 28 wherein said detection means comprises:
a digitizer for digitizing the received energy from the plurality of reference signal sources;
a buffer for storing the digitized energy; and
a code detector for detecting reference signals by comparing the digitized energy with a predetermined pattern.

30. The geolocation system of claim 28 wherein the locating station further comprises:
a second database comprising historical geolocation information for each reference signal source;
a second comparison means for comparing the accuracy of the historical geolocation information for each of the reference signal sources with a predetermined criteria and outputting a comparison signal; and
a first updating means for receiving said comparison signal and updating the geophysical coordinate information in the first database based on the value of the comparison signal.

31. The geolocation system of claim 28 wherein the locating station further comprises:
determination means for determining the number of reference signals received by the mobile appliance from the information in said first signal and determining if the number of received reference signals is greater than a predetermined amount;

identification means for identifying new received reference signals; and a second updating means for updating said first database with new reference signal source geophysical coordinate information.

32. The geolocation system of claim 28 wherein said locating station and at least one of said reference signal sources are co-located.

33. The geolocation system of claim 28 wherein said locating station and said mobile appliance are co-located.

34. A system for geolocating a mobile appliance in a service area from ones of a plurality of reference signal sources in disparate communication systems comprising:

said mobile appliance comprising:
 a receiver for receiving energy from ones of the plurality of reference signal sources,
 detection means for detecting reference signals from said received energy and calculating the amplitude of the detected reference signals and the time difference of arrival between pairs of said detected reference signals; and
 a transmitter for transmitting to a locating station a first signal representative of the amplitudes of the detected reference signals and the time difference of arrival between pairs of said detected reference signals;

said locating station comprising:
 a receiver for receiving said first signal;
 a first database comprising:
  geophysical coordinates of each of the plurality of reference signal sources; and
  a mapped pattern of amplitudes of reference signals and time differences between pairs of reference signals emitted from the plurality of reference signal sources;
 a first comparison means for comparing the amplitude and time difference of arrival information in said first signal with the mapped pattern of amplitudes and time differences in the first database; and
 TDOA means for geolocating the mobile appliance;

whereby the mobile appliance receives energy from ones of the plurality of reference signal sources, detects reference signals from said received energy, calculates the amplitude of detected reference signals and the time difference of arrival between pairs of said detected reference signals, transmits a first signal representative of the amplitudes and time differences of arrival to the locating station; and whereby the locating station receives said first signal, compares the received amplitude and time difference of arrival information in said first signal with the mapped pattern of amplitude and time differences to thereby determine the approximate location of the mobile appliance, and subsequently geolocates the mobile appliance by TDOA techniques.

35. In a method of geolocating a mobile appliance operatively communicating with at least one base station in a first communication system from a plurality of reference signal sources by TDOA techniques, the improvement wherein the mobile appliance is not synchronized with the reference signal sources wherein the reference signal sources are in a second communication system disparate from the first communication system.

* * * * *